United States Patent Office 3,189,577
Patented June 15, 1965

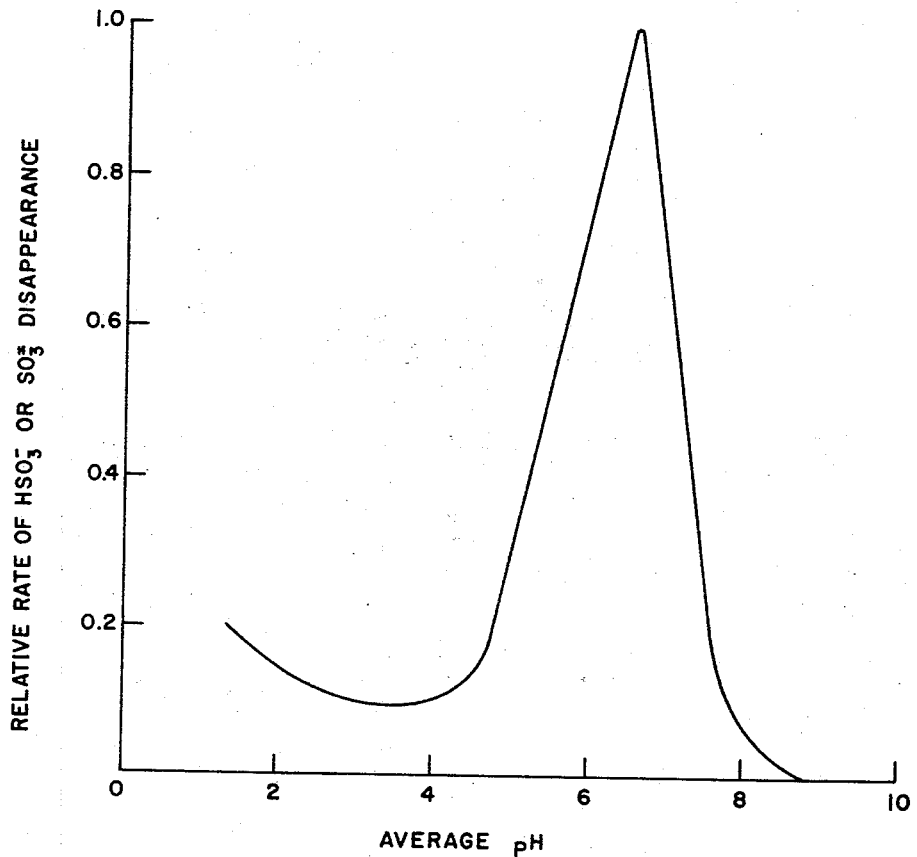

3,189,577
PROCESS FOR CONVERTING α,β-ETHYLENICALLY UNSATURATED ALDEHYDE POLYMERS TO WATER-SOLUBLE DERIVATIVES
Elliott E. Ryder, Jr., Alameda, and Philip Pezzaglia, El Cerrito, Calif., assignors to Shell Oil Company, New York, N.Y., a corporation of Delaware
Filed Feb. 9, 1962, Ser. No. 172,840
14 Claims. (Cl. 260—67)

This invention relates to a process for converting water-insoluble aldehyde polymers to water-soluble derivatives. More particularly, the invention relates to a new and improved process for converting water-insoluble high molecular weight polymers of unsaturated aldehydes into water-soluble derivatives, and to the resulting products.

Specifically, the invention provides a new and highly efficient process for rapid conversion of water-insoluble high molecular weight polymers of alpha,beta-ethylenically unsaturated aldehydes, such as acrolein, into water-soluble derivatives. The process comprises accomplishing the dissolution of the water-insoluble polymer in an aqueous medium which contains less than an equivalent amount of a material which releases sulfur dioxide if heated, such as, for example, sodium bisulfite, while maintaining the aqueous medium substantially neutral over a greater part of the reaction, and keeping the concentration of the water-insoluble polymer in the reaction medium preferably below about 30% by weight.

It is known that unstabilized acrolein changes spontaneously into a solid water-insoluble polymer known as "disacryl." This same insoluble polymer can also be obtained by heating the acrolein to a high temperature with a peroxide catalyst. While easy to prepare, these products have never acquired any technical importance, particularly because of their low molecular weight and their insolubility.

It has recently been found that acrolein can be converted to high molecular weight polymers by effecting the polymerization in a water system using certain catalysts and conditions. One of these special polymerization techniques is disclosed and claimed in copending patent application Serial No. 859,154, filed December 4, 1959, now Patent No. 3,167,529. It has also been found that these high molecular weight polymers can be converted to water-soluble derivatives by slurrying the polymer in an aqueous sulfur dioxide or aqueous sodium bisulfite solution containing an excess of that material.

While soluble derivatives can be prepared by this technique, the method of dissolving the polymer in the aqueous sulfur dioxide or sodium bisulfite solutions is not particularly suited for large scale commercial use. It has been found, for example, that such dissolution takes considerable time. High temperatures cannot be used to speed the reaction as such temperatures tend to cause gelation. In addition, the dissolution requires the use of an excess of the dissolving material. This gives a product which contains a large amount of combined dissolving agent, such as sulfur dioxide, and such products are not particularly suited for applications as the hereinafter noted treatment of paper. In addition, attempts to neutralize the products many times cause gelations. Furthermore, many of the water-soluble derivatives obtained by this method are highly discolored and contaminated with impurities.

It is an object of the invention, therefore, to provide a new process for converting water-insoluble polymers of unsaturated aldehydes to water-soluble derivatives. It is a further object to provide an improved process for converting water-insoluble aldehyde polymers to water-soluble derivatives which can be accomplished at a fast rate. It is a further object to provide a process for dissolution of water-insoluble aldehyde polymers which can be accomplished at high temperatures without danger of gelation. It is a further object to provide a new process for dissolution of water-insoluble aldehyde polymers that can be accomplished with the use of only very small amounts of the dissolving agent. It is a further object to provide a process for preparing water-soluble derivatives of aldehyde polymers which contain small amounts of combined dissolving agent and are suitable for many important applications. It is a further object to provide a process for preparing water-soluble derivatives which contain small amounts of residual dissolving agent. It is a further object to provide a new process for converting aldehyde polymers to water-soluble derivatives which are not discolored but obtainable as substantially white materials. It is a further object to provide a method for preparing water-soluble derivatives which avoids necessity of neutralization of the product and thus avoids the danger of gelation. It is a further object to provide a new process for converting aldehyde polymers into water-soluble derivatives which are particularly useful for the treatment of fibrous materials, such as paper. These and other objects of the invention will be apparent from the following detailed description thereof.

It has now been discovered that these and other objects may be accomplished by the process of the invention which comprises accomplishing the dissolution of the water-insoluble polymer in an aqueous medium which contains less than an equivalent amount of a material which releases sulfur dioxide if heated, such as, sodium bisulfite, while maintaining the aqueous medium substantially neutral over a greater part of the reaction, and keeping the concentration of the water-insoluble polymer in the reaction medium preferably below about 30% by weight. It has been found unexpectedly that this new technique permits dissolution of the water-insoluble polymers at a surprisingly fast rate. In addition, it permits dissolution at the higher reaction temperatures without danger of gelation so that the rate may be increased even more by the use of the higher temperatures. Furthermore, the process effects the dissolution with the use of only small amounts of the dissolving agent, such as the sodium bisulfite. As a result, the products contain only small amounts of the combined dissolving materials and also small amounts of unreacted dissolving reagent and are thus more suited for intended applications, such as treatment of paper. In addition, there is no need for neutralization of the product and the product may be used directly in the intended application. In fact, the products obtained by the new process are particularly outstanding for the treatment of fibrous materials, such as paper and the like, as they impart greatly improved wet strengths thereto. Further advantage is also found in the fact that the above process permits one to obtain products which are free of discoloration and obtainable as substantially white materials.

The alpha,beta-ethylenically unsaturated aldehydes used in making the basic polymers comprise those aldehydes having an ethylenic group in an alpha,beta-position relative to the aldehyde group, such as, for example, acrolein, alpha and beta-substituted acroleins such as alpha-ethylacrolein, alpha-isobutylacrolein, alpha - chloroacrolein, beta-phenylacrolein, alpha-decylacrolein, alpha - cyclohexylacrolein, alpha-methylacrolein and the like. Preferred aldehydes to be employed in making the polymers include the alpha,beta-monoethylenically unsaturated aldehydes containing from 3 to 12 carbon atoms, and especially acrolein and the alpha and beta-substituted acroleins wherein the substituent on the alpha and/or beta positions is an alkyl, cycloalkyl or aryl group containing no more than 8 carbon atoms. 2-alkenals containing up to 8 carbon atoms come under special consideration.

The polymers include not only the homopolymers of the unsaturated aldehydes, but also the copolymers of the aldehydes with other ethylenically unsaturated monomers such as those possessing at least one $>C=C<$ group, and preferably those containing a $CH_2=C<$ group, such as, for example, styrene, alpha-methylstyrene, butadiene, isoprene, methylpentadiene, ethylene, propylene, isobutylene, isooctene, vinyl acetate, vinyl propionate, vinylpyridine, vinylpyrolidone, vinylnaphthalene, vinylcyclohexene, acrylonitrile, methacrylonitrile, vinyl chloride, vinylidene chloride, acrylate esters as methyl methacrylate, ethyl acrylate, ethyl methacrylate, butyl acrylate and allylic compounds such as allyl acetate, allyl acohol, allyl butyrate, allyl benzoate, allyl cyclohexanecarboxylate, and the like. These additional monomers are preferably employed in minor amounts, and preferably in amounts varying from about 5% to 40%, and preferably 1% to 35%, by weight of the mixture of monomers.

The polymers of the above-described unsaturated aldehydes to be employed in preparing the new derivatives of the present invention are those obtained by addition polymerization through the double bond and those having a molecular weight ranging from about 30,000 to 10,000,000 and higher, said molecular weights being determined by the light scattering technique. The molecular weight range may also be indicated by intrinsic viscosity values as these are usually more easily determined. Preferred polymers are those having intrinsic viscosities (as determined on the solubilized form of the polymer) of at least 0.3 dl./g. and preferably 0.9 to 5.0 dl./g. These values are determined by the conventional technique of polyelectrolyte viscosity measurements at 25° C.

The preferred polymers are those possessing a high theoretical aldehyde function, i.e., when the polymer is subjected to conventional tests for the presence of aldehyde groups (e.g., addition of hydroxylamine hydrochloride and titrated liberated $H_2O$ with Karl Fischer reagent) the results show a high percent, e.g., above 90%, and preferably 95% to 99%, of the theoretical aldehyde groups present as such or in the hydrated form. Many of the preferred polymers have the aldehyde groups present in the hydrated form as

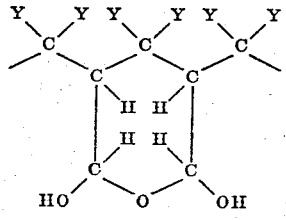

and some

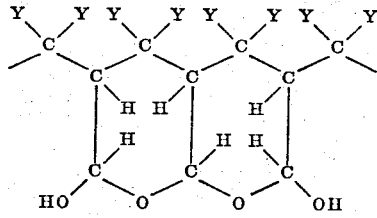

where Y is hydrogen or lower aykyl.

The above-described polymers may be prepared by a variety of different methods. They may be prepared, for example, by heating the unsaturated aldehyde with free radical catalysts, such as peroxides as benzoyl peroxide, tertiary butyl hydroperoxide, tertiary butyl perbenzoate, tertiary butyl peracetate and the like, in bulk, emulsion or suspension systems.

High molecular weight polymers which give outstanding results in the process of the invention are described and claimed in copending patent application Serial No. 859,156, filed December 14, 1959, now Patent No. 3,079,357, and copending application Serial No. 859,154, filed December 14, 1959, and so much of the disclosure of these two applications relative to these polymers and derivatives and their preparation is incorporated into this application.

The preparation of some of the unsaturated aldehyde polymers by the above-noted method is illustrated below.

POLYMER A 100 parts of acrolein was added to 400 parts of water to this mixture was added .271 part of potassium persulfate, .203 part of ferrous chloride tetrahydrate, 1 part of nonyl-phenol-ethylene oxide adducts as anti-coalescent agent and .4 part of disodium salt of ethylene diamine tetacetic acid. The resulting mixture was stirred for 24 hours at room temperature under atmosphere of nitrogen. During this period a white solid precipitated to the bottom. The mixture was filtered and the solid precipitate was washed with water and dried to yield 47 parts of polymer. The resulting product was a white powder polymer having an intrinsic viscosity (as determined on the sulfur dioxide solubilized form) of 1.8 dl./g.

POLYMER B 100 parts of acrolein was added to 300 parts of water and to this mixture was added .272 part potassium persulfate, .203 part of ferrous chloride tetrahydrate and .4 part of disodium salt of ethylene diamine tetracetic acid. The resulting mixture was stirred for 25 hours at 0° C. under an atmosphere of nitrogen. During that period a white solid precipitated to the bottom. The mixture was filtered and the solid precipitate was washed with water and dried to yield 27 parts polymer. The resulting product was a white powder polymer having an intrinsic viscosity (as determined on the sulfur dioxide solubilized form) of 2.3 dl./g.

POLYMER C 1000 part of acrolein was added to 2000 parts of water and to this mixture was added 2.73 parts of potassium persulfate, 2.02 parts ferrous chloride tetrahydrate, 10 parts of nonylphenol-ethylene oxide condensate and 4 parts of disodium salt of ethylene diamine tetracetic acid. This mixture was stirred for 42 hours at room temperature (20° C.) under nitrogen. The resulting product was a white powder polymer having an intrinsic viscosity of 1.5.

POLYMER D 100 parts of acrolein was added to 325 parts of water and to this mixture was added 2.70 parts of potassium persulfate, 2.00 parts of ferrous chloride tetrahydrate and 4 parts of disodium salt of ethylene diamine tetracetic acid. This mixture was kept at room temperature for 6 hours with stirring and under an atmosphere of nitrogen. The resulting 46 parts of product was a white powder polyacrolein having an intrinsic viscosity of 1.02 dl./g.

The above-described high molecular weight water-insoluble polymers of the unsaturated aldehydes are converted to water-soluble derivatives according to the present invention by accomplishing the dissolution of the polymer in an aqueous medium which contains less than an equivalent amount of a material which releases sulfur dioxide if heated, such as, for example, sodium bisulfite, while maintaining the aqueous medium substantially neutral over a greater part of the reaction, and keeping the concentration of the water-insoluble polymer in the reaction medium preferably below about 30% by weight.

The material used as dissolving agent includes those whose aqueous acidic solution release sulfur dioxide if heated, say to a temperature of 100° C. Examples of such materials include, among others, sulfur dioxide itself, alkali metal bisulfites, such as sodium bisulfite and potassium bisulfite, sodium metabisulfite, ammonium sulfite, ammonium bisulfite, diethyl methyl ammonium bisulfite, and addition products of sulfur dioxide and various aldehydes and ketones, such as, for example, adducts of sulfur dioxide and acetone, and the like, and mixtures thereof.

The amount of the sulfur dioxide-containing material to be used in the reaction may vary over a considerable range. In general, it is preferred to employ at least about .2 times the stoichiometric amount, and still more preferably from .5 to .8 times the stoichiometric amount. By stoichiometric amount is meant that amount needed to furnish one mol of the sulfur dioxide-containing material per mol of the unsaturated aldehyde present in the polymer. The exact amount to be used in each case will generally depend upon the degree of reaction desired and the reacting temperature. As noted, it is generally desired for applications such as treatment of paper to keep the amount of sulfur in the water-derivative as low as possible. For example, for treatment of paper, it is generally perferred to have products containing from about .2 to .5 mol of dissolving agent combined in the polymer per mol of unsaturated aldehyde in the polymer. To prepare such preferred products, it is desirable to utilize approximately this range of reactants during the dissolution reaction.

The reaction may be accomplished in any suitable aqueous reaction medium, such as, for example, a straight water solution or water solutions containing other materials, such as alcohols, stabilizing agents, emulsifying agents, plasticizers, dyes, pigments and the like. Best results are generally obtained, however, when the reaction is conducted in a straight water solution.

The amount of the high molecular weight water-insoluble polymer to be added to the above solution may vary over a considerable range, depending chiefly on the viscosity or the intrinsic viscosity of the polymer selected. The reaction mixture should be one that is easily stirrable. In general, the amount of the polymer employed will vary from about 1% to 40%, and still more preferably from 1% to 30% by weight of the reaction mixture.

It is an important feature of the process that the reaction mixture be maintained substantially neutral over a greater part of the reaction mixture. As shown below, the pH of the water solution containing the above-noted sulfur dioxide-containing dissolving agents is relatively low, e.g., pH of about 1.0 to 4. It is thus necessary to adjust the pH of the solution at the beginning or soon thereafter so that the mixture is substantially neutral and remains within that range during the greater part of the reaction. By substantially neutral is meant that range where solutions are considered neutral for practical purposes, say, for example, pH's of 6.0 to 7.5. A pH within this range can be obtained by addition of materials, such as sodium hydroxide or other basic materials. During or near the end of the reaction if the pH tends to go outside of this range to the basic side, it will be necessary to add acidic materials, such as sulfuric acid, to bring the pH back within the range.

A preferred technique involves use of conventional pH regulators so that the mixture is at all times kept within the desired range by automatic control. In other cases, one may want to start with a solution having a pH on the lower side, say, for example, pH of 6.0, and utilize larger amounts of the NaHSO$_3$, such as shown in the working examples.

The temperature employed in the reaction may also vary over a wide range depending upon the desired rate of reaction. As noted above, an advantage of the process is that it can operate at the higher temperatures without danger of gelation. Accordingly, for greater speed of dissolution it may be desirable to operate at the higher temperatures, such as, for example, 50° C. to 80° C. In general, temperatures may range from about 10° C. to 90° C. with a preferred range being between 20° C. and 60° C.

Atmospheric, subatmospheric, or superatmospheric pressures may be utilized as desired.

It is desirable during the reaction to keep the polymer particles suspended in the reaction medium so that the insoluble polymer particles will not settle out. This may be accomplished by any suitable means such as by stirring, shaking, or tumbling the reactor. It is preferred to stir the reaction mixture at a rate ranging from about 25 r.p.m. to 200 r.p.m.

The reaction is preferably continued until substantially all of the polymer has dissolved. In most cases there will be a small amount of polymer, e.g., 2 to 4%, which is difficult to dissolve. The reaction can then be taken up to the point where say 96 to 98% has dissolved and then the mixture filtered to obtain the clear solution. The temperature may also be increased near the end of the process to speed dissolution of the more difficultly soluble materials.

The new derivatives formed by the above-described reaction will have a high degree of water solubility and will remain in the reaction mixture. The substantially neutral reaction mixture can be used as such in the various intended applications such as for the treatment of fibrous materials as described herein, or the polymeric derivatives may be recovered from the mixture as solid products and then subsequently utilized in the intended applications. In this latter case the water-soluble derivative may be recovered by any suitable means, such as evaporation, distillation, spray drying and the like.

When recovered from the aqueous reaction mixture the new water soluble derivatives appear as substantially white solid polymeric products. They will have substantially the same intrinsic viscosity as the basic polymers used in their preparation, i.e., they will have intrinsic viscosities preferably ranging from 0.3 dl./g. to as high or higher than 3.5 dl./g. On a molecular weight basis, products will have molecular weights preferably ranging from 30,000 to 5,000,000 or higher as determined by the light scattering technique.

The water soluble derivatives will also be characterized by containing a plurality of free water soluble salt sulfonate groups. For example, the polymer may contain

units, wherein X is preferably an alkali metal or alkaline earth metal. As all the aldehyde groups will not be converted to the sulfonate group, the polymers will also contain some residual hydrated aldehyde groups, such as

As noted above, the preferred products will have from 0.1 to 0.8 sulfonic acid or sulfonate unit per aldehyde unit, and still more preferably from about 0.2 to 0.5 SO$_3$ units per aldehyde unit present in the polymer.

The water solubilized polymers may be used for a great many applications. As water solutions, they may be used in the formation of films, threads, treatment of animal skins, and the like, and as coatings for various materials as wood, metal and the like.

The polymers solubilized with alkali bisulfites and aqueous sulfur dioxide have been found to be particularly useful as wet strength agents for paper. In this application, the polymers may be applied during the beater stage or as an after-treatment for the paper. Preferably the aqueous solution of the polymer is added during the beater stage when the suspension of paper pulp is being rapidly agitated. This addition may be at the beginning of the beater operation or intermittently or at the end of the operation. If the aqueous solution is applied to the finished paper, it may be added by spraying, or by rollers or by dipping or running the paper through the conventional padding apparatus.

After the aqueous solution has been applied to the paper an indicated above, the treated product is subsequently dried to effect cure. The drying may be accomplished by merely rolling or squeezing off the excess solution and then setting out in the air to dry or by using forced air. Temperatures used in the drying may vary from about room temperature, e.g., about 20° C. to 100° C. The period of drying will depend largely on the amount of pick-up and concentration of the polymer solution. In most instances, drying periods of from about 1 to 30 minutes should be sufficient.

Any type of paper may be treated according to the process of the invention. Examples of such paper include, for example, those prepared from wood, cotton, linen, hemp, jute, mulberry, straw, bamboo, cane and agone fibers or mixtures thereof, by any of the known processes such as the sulfate process, soda process and sulfite process. The paper may be colored or white and may be further treated for special applications.

The paper treated according to the above may be used for a variety of applications, such as facial tissue, hand towels, maps, filing cards, construction paper, wrapping paper, containers and the like. Because of its resistance to hydrolysis and relative non-toxic nature, the paper is particularly suited for use in preparing wrapper or containers for food.

The process of the invention has been described above as a means for solubilizing polymers of unsaturated aldehydes. This should be taken to include the use of copolymers of the above-noted unsaturated aldehydes with another aldehyde or with another compound containing an ethylenic group, such as, for example, acrylonitrile, methacrylonitrile, crotonaldehyde, acrylic acid, methacrylic acid, methyl acrylate, ethyl acrylate, methyl methacrylate, butyl acrylate, vinyl acetate, dibutyl maleate, diethyl maleate, allyl acetate, allyl butyrate, allyl benzoate, vinyl benzoate, vinyl chloride, vinylidene chloride, styrene, butadiene, methylpentadiene, alpha-methylstyrene, vinylpyridine, N-vinylpyrrolidone, acrylamide, N-methyl acrylamide, isoprene, 1,4-octadiene, diallyl phthalate, divinyl phthalate, divinyl adipate, ethylene, propylene, isobutylene, and the like, and mixtures thereof. Particularly preferred monomers to be employed include the alpha,beta-ethylenically unsaturated nitriles, the alkyl esters of the acrylic and alpha-substituted acrylic acids, olefins and diolefins, vinyl esters of monocarboxylic acids, allyl esters of mono- and polycarboxylic acids, unsaturated esters of polyhydric alcohols as acrylic acid ester of glycerol, vinyl halides, such as vinyl chloride, unsaturated nitrogen-containing monomers, such as acrylamide, and the like and mixtures thereof, all members of the foregoing preferably containing no more than 12 carbon atoms each.

The amount of the above-described dissimilar unsaturated monomers to be employed with the unsaturated aldehydes in making the copoylmers may vary over a wide range. In general, the amount of the dissimilar monomer may vary from about .1% to as high or higher than 80% by weight of the combined mixture. Preferred amounts of the dissimilar monomer vary from about 1% to 50% by weight of the combined mixture. Such copolymers may be prepared by the same process described above for the preparation of the acrolein homopolymers.

To illustrate the manner in which the invention may be carried out, the following examples are given. It is to be understood, however, that the examples are for the purpose of illustration and the invention is not to be regarded as limited to any of the specific materials or conditions recited therein. Unless otherwise indicated, parts are parts by weight.

Example I

This example illustrates the unexpected results that are obtained by using the process of the invention in preparing a water-soluble derivative of polyacrolein using an aqueous sodium bisulfite solution.

A series of aqueous solutions of sodium bisulfite was prepared. The solutions had a concentration of about 5% $NaHSO_3$. To these solutions were added a polyacrolein having an intrinsic viscosity of 2.2 dl./g. so as to form solutions having a concentration of about 5%. The pH of the solutions was about 4 and one solution was allowed to remain at that pH. The pH of the remaining solutions was adjusted by the addition of sodium hydroxide or sulfuric acid as the case required so that the pH ranged from 4 to 8. The solutions were then stirred at 25° C. The rate of reaction in each case was determined by the rate of disappearance of $HSO_3^=$ or $SO_3^=$ ions. The pH of each solution was determined periodically and the average determined for each solution. The results are shown in the attached graph where the average pH was plotted against the relative rates. The results in the graph clearly demonstrate the great improvement in rate of reaction that is obtained when the average pH is substantially neutral.

The water-soluble polyacrolein-$SO_2$ derivative prepared in the solution which was substantially neutral was diluted with water to form 0.5%, 1% and 2% aqueous solutions. Sheets of rag and kraft paper were passed into and through this solution and then pressed out on dry paper and allowed to dry at room temperature. The resulting product had the appearance, feel and flexibility of the untreated paper but demonstrated improvement in fold endurance, dimensional stability and improved wet strength.

Example II

This example illustrates the unexpected results obtained by operating the process of the invention at 50° C.

About 15.23 parts of sodium metabisulfite was added to 216.32 parts of water. To this mixture was added 18.45 parts of a polyacrolein having an intrinsic viscosity of about 2.8 dl./g. To this mixture was added 8.2 parts of sodium hydroxide to adjust the pH to 6. This mixture was heated to 50° C. The pH rapidly rose to within the range 6.5 to 7. In about 45 minutes a clear solution of the water-soluble derivative was obtained.

In a related experiment wherein the pH was not adjusted to 6 but kept at 4 and the mixture heated at 50° C., the dissolution took over 8 hours.

Example III

This example illustrates the ability of the process of the invention to produce products having a small amount of the sulfur dioxide combined in the polymer.

About 10.88 parts of sodium metabisulfite was added to 220.67 parts of water and to this mixture was added 18.45 parts of polyacrolein having an intrinsic viscosity of 2.8. The ratio of bisulfite to acrloein units was 0.5/1. The pH was adjusted to 6.0 by the addition of 5.04 parts of sodium hydroxide. The pH rose during the reaction to 6.5. The mixture was kept at 50° C. as in the preceding example. In about 1 hour and 25 minutes, a clear solution had been obtained. Analyses indicated the derivative had a ratio of sulfonate groups per acrolein units of 0.441.

The water-soluble polyacrolein-sulfur dioxide adduct prepared above wherein the sulfur dioxide and acrolein units were in a ratio of 0.5/1 was diluted with water to form 0.5% to 2% aqueous solutions. Sheets of rag and kraft paper were passed into and through these solutions and then pressed out on dry paper and allowed to dry at room temperature. The resulting product had the appearance, feel and flexibility of the untreated paper but demonstrated improvement in fold endurance, dimensional stability and improved wet strength. The product prepared as above with a low ratio of sulfur dioxide to acrolein units performed better on paper than those having higher amounts of the sulfur dioxide combined.

In related experiment wherein a polyacrolein was dissolved in water solution of sodium metabisulfite with no control over pH, i.e., the initial pH was about 4. No dissolution could be obtained at such a low amount of sodium bisulfite and additional amounts had to be added to obtain dissolution. The resulting product containing a large amount of bound dissolving agent did not perform as well on paper.

Example IV

Example III was repeated with the exception that the ratio of sulfur dioxide to acrolein units was 0.4/1. In this case, the clear solution was obtained in 1 hour and 10 minutes. The resulting product gave excellent results when applied to paper.

Example V

Example III was repeated with the exception that the initial pH was 7 and the pH was maintained at that level during the reaction. In this case, a clear solution was obtained in about 45 minutes, and resulting product gave excellent results when applied to paper.

Example VI

Example III was repeated with the exception that the temperature employed was 25° C. In this case, a clear solution was obtained in about 2 hours. The resulting product gave excellent results when applied to paper.

Example VII

Example III was repeated with the exception that the dissolving agent employed was sodium bisulfite. Related results are obtained.

Example VIII

Example III was repeated with the exception that the dissolving agent employed was aqueous sulfur dioxide. NaOH is added to adjust pH to 6.0. Related results are obtained. In a related experiment wherein no NaOH was added, the mixture gelled.

Example IX

Example III was repeated with the exception that the polyacrolein had an intrinsic viscosity of 1.9 dl./g. Related results are obtained.

Example X

Example III was repeated with the exception that the polyacrolein had an intrinsic viscosity of 2.5 dl./g. Related results are obtained.

Example XI

Example III was repeated with the exception that the polymer employed was a copolymer of 90 parts of acrolein and 10 parts of acrylonitrile having an intrinsic viscosity of 1.2 dl./g. The copolymer dissolved at a fast rate and the resulting product demonstrated good wet strength properties when applied to paper.

Example XII

Example III was repeated with the exception that sodium sulfite was used in place of the sodium bisulfite and sulfuric acid was added to adjust the pH to 6. Related results are obtained.

Example XIII

Example III was repeated with the exception that the temperature employed was 25° C., until near the end of the reaction and then the temperature was raised to 60° C. for a short while to accelerate the dissolution of the more difficultly soluble material. Related results are obtained.

We claim as our invention:

1. A process for converting water-insoluble high molecular weight polymers of alpha,beta-ethylenically unsaturated aldehydes, which polymers contain at least 60% by weight of the unsaturated aldehyde units and are obtained by addition polymerization of the aldehyde through the ethylenic group, into a polymer which is soluble in water which comprises mixing the polymer with an aqueous medium which contains less than an equivalent amount of a material which releases sulfur dioxide when an acidified aqueous solution thereof is heated to 100° C., while maintaining the aqueous medium substantially neutral over a greater part of the reaction.

2. A process for converting a water-insoluble high molecular weight polymer of acrolein, which polymer contains at least 60% by weight of acrolein units and are obtained by addition polymerization of the acrolein through the ethylenic group, into a polymer which is soluble in water which comprises adding the polymer to an aqueous medium containing less than an equivalent amount of a material which releases sulfur dioxide when heated to 100° C., while maintaining the aqueous medium substantially neutral over substantially the entire course of the reaction, and keeping the concentration of the water-insoluble polymer in the reaction mixture below above 30% by weight.

3. A process as in claim 2 wherein the concentration of the polymer in the aqueous medium is between .5 and 20% by weight.

4. A process as in claim 2 wherein the material which releases sulfur dioxide is sodium bisulfite.

5. A process as in claim 2 wherein the material which releases sulfur dioxide is sodium metabisulfite.

6. A process as in claim 2 wherein the material which releases sulfur dioxide is sulfur dioxide itself.

7. A process as in claim 2 wherein the ratio of the sulfur dioxide forming material and the acrolein units in the polymer varies from about 0.2/1 to 0.8/1.

8. A process as in claim 2 wherein the polyacrolein has an intrinsic viscosity between 0.3 dl./g. and 5.0 dl./g. as determined on the $SO_2$-solubilized polymer by polyelectrolyte viscosity measurement at 25° C.

9. A process as in claim 2 wherein the reaction is conducted at a temperature between 10° C. and 90° C.

10. A process as in claim 2 wherein the pH of the reaction mixture is maintained between 5.5 and 7.5 during a greater part of the reaction period.

11. A process as in claim 2 wherein the pH is maintained within the range of 6.5 to 7.5 during the entire course of the reaction.

12. A process for converting a water-insoluble polymer of acrolein, which polymer contains at least 60% by weight of acrolein units and are obtained by addition polymerization of the acrolein through the ethylenic group, into a water-soluble polysulfonate at a fast rate which comprises adding from .1% to 10% by weight of the polymer to an aqueous medium containing dissolved sodium bisulfite in an amount so as to furnish 0.3 to .8 mol per mol of acrolein in the polymer, and maintaining the pH of the reaction mixture substantially neutral during the substantial part of the reaction period, the temperature of the reaction being between 20° C. and 60° C.

13. A process as in claim 12 wherein the polymer has an intrinsic viscosity between 0.5 dl./g. and 5.0 dl./g. as determined on the $SO_2$-solubilized polymer by polyelectrolyte viscosity measurement at 25° C.

14. A process as in claim 2 wherein the polymer is a copolymer of acrolein and a dissimilar monomer containing an ethylenic group, said copolymer containing at least 5% weight of acrolein.

(References on following page)

References Cited by the Examiner

UNITED STATES PATENTS

| | | | |
|---|---|---|---|
| 3,036,978 | 5/62 | Kern et al. | 260—73 |
| 3,068,203 | 12/62 | Schweitzer | 260—67 |
| 3,079,296 | 2/63 | Houff et al. | 260—67 |
| 3,079,357 | 2/63 | Fischer | 260—67 |

FOREIGN PATENTS

| | | |
|---|---|---|
| 506,504 | 10/54 | Canada. |
| 855,889 | 12/60 | Great Britain. |

WILLIAM H. SHORT, *Primary Examiner.*
J. R. LIBERMAN, MILTON STERMAN, *Examiners.*